United States Patent [19]

Miki et al.

[11] Patent Number: 4,596,165
[45] Date of Patent: Jun. 24, 1986

[54] DIRECT COUPLING CLUTCH CONTROL SYSTEM FOR AUTOMATIC TRANSMISSION

[75] Inventors: Nobuaki Miki, Kariya; Keizo Kobayashi, Anjo, both of Japan

[73] Assignee: Aisin Warner Kabushiki Kaisha, Aichi, Japan

[21] Appl. No.: 670,666

[22] Filed: Nov. 13, 1984

Related U.S. Application Data

[63] Continuation of Ser. No. 238,311, Feb. 26, 1981, abandoned.

[30] Foreign Application Priority Data

Feb. 29, 1980 [JP] Japan ................... 55-25746

[51] Int. Cl.⁴ ............... B60K 41/10; F16D 33/00
[52] U.S. Cl. ............................ 74/869; 74/731; 74/861; 192/3.31
[58] Field of Search ............ 74/645, 731, 732, 861, 74/867, 868, 869; 192/3.31, 0.076, 3.28, 0.033, 3.57

[56] References Cited

U.S. PATENT DOCUMENTS

| | | | |
|---|---|---|---|
| 2,351,483 | 6/1944 | Carnagua | 192/3.31 |
| 2,824,631 | 2/1958 | DeLorean | 74/868 |
| 2,940,336 | 6/1960 | Simpson et al. | 74/645 |
| 2,965,202 | 12/1960 | Christenson | 74/732 |
| 3,638,771 | 2/1972 | Chana | 74/869 |
| 3,693,478 | 9/1972 | Malloy | 74/731 |
| 3,752,009 | 8/1973 | Chana | 74/869 |
| 3,893,551 | 7/1975 | Ahlen | 74/732 |
| 4,004,417 | 1/1977 | Woody et al. | 192/3.31 |
| 4,095,486 | 6/1978 | Ohnuma | 74/645 |
| 4,108,022 | 8/1978 | Arai et al. | 74/645 |
| 4,294,140 | 10/1981 | Iwanaga et al. | 74/868 |
| 4,349,088 | 9/1982 | Ito et al. | 74/731 |
| 4,369,865 | 1/1983 | Sunohara et al. | 74/731 |

FOREIGN PATENT DOCUMENTS

5229570   3/1977   Japan ................... 74/869

*Primary Examiner*—Allan D. Herrmann
*Assistant Examiner*—Joseph M. Rolnicki
*Attorney, Agent, or Firm*—Blum Kaplan Friedman Silberman & Beran

[57] ABSTRACT

A clutch piston slidably mounted for motion in the axial direction on the turbine shaft or the turbine runner of a torque converter comprising a pump, an impeller, a turbine runner and a stator. A direct coupling clutch is positioned between the clutch piston and the housing of a torque converter. Pressurized oil is supplied for releasing the clutch within an oil chamber between one side of the clutch piston and the housing. A converter pressure is continuously applied to the oil chamber and to the other side of the clutch piston, which is the operating chamber of the torque converter. Thereby, the direct coupling clutch is continuously released. When the automatic transmission is in a selected high speed position, a line pressure higher than the converter pressure, is applied to the operating chamber causing the direct coupling clutch to engage. Converter pressure is applied continuously to the operating chamber of the torque converter through one port of a check valve. The other check valve port is connected to the line pressure only when the automatic transmission is shifted to said high speed position, causing the direct coupling clutch to automatically engage.

27 Claims, 5 Drawing Figures

DIRECT COUPLING CLUTCH CONTROL SYSTEM FOR AUTOMATIC TRANSMISSION

This is a continuation of application Ser. No. 238,311 filed on Feb. 26, 1981 now abandoned.

BACKGROUND OF THE INVENTION

This invention relates generally to an automatic transmission equipped with a torque converter comprising a pump, an impeller, a turbine runner and a stator and more particularly to a controller for a direct coupling clutch. It is known to provide a direct coupling clutch between the turbine shaft and the housing of the torque converter for directly coupling the input shaft of the torque converter and the turbine shaft as required. It is the conventional procedure to control engagement and disengagement of the direct coupling clutch by switching oil passages related to operation of the direct coupling clutch by actuating a switching valve of the spool-type. The valve operates in correspondence with pressure signals generated by the hydraulic control circuit of the automatic transmission. This requires complex control circuitry including the switching valve. If the spool valve became stuck for some reason, the direct coupling clutch cannot operate. Particularly, when the spool valve became stuck while the direct coupling clutch is engaged, the torque converter cannot function.

What is needed is a direct coupling clutch control system which operates automatically without use of special switch valves and circuitry, and protects the transmission and torque converter.

SUMMARY OF THE INVENTION

Generally speaking, in accordance with the invention, a clutch control system especially suitable for an automatic transmission and torque converter is provided. In an automatic transmission equipped with a gear-type transmission and a torque converter including a pump, an impeller, a turbine runner and a stator, a direct coupling control system comprises a clutch piston mounted slidably in the axial direction on the turbine runner or the turbine shaft, a direct coupling clutch constituted between the clutch piston and the housing of the torque converter, a first pressurized fluid passage connected to a pressure chamber formed between the housing and the clutch piston, a second pressurized fluid passage connected to the operating chamber of the torque converter, means to continuously introduce a first pressurized fluid, the pressure of which is controlled within the hydraulic control circuit of the automatic transmission, to the first fluid passage, means to continuously introduce the first pressurized fluid to the second fluid passage, and when the automatic transmission is shifted to a high speed position, means to connect the second fluid passage to a fluid passage through which the second pressurized fluid flows, at a pressure higher than that of the first pressure fluid, said second fluid pressure being controlled by the hydraulic control circuit of the automatic transmission to engage the clutch.

Accordingly, it is an object of this invention to provide an improved control circuit of a simple construction which continuously keeps a direct coupling clutch released by supplying pressurized fluid from the hydraulic control circuit of an automatic transmission to a clutch releasing fluid chamber. When the automatic transmission is shifted to a position suitable for engaging the direct coupling clutch, the pressurized fluid makes the direct coupling clutch engage by supplying to a clutch engaging pressure fluid chamber pressurized fluid at a pressure higher than the pressure supplied to the clutch releasing fluid chamber.

Another object of this invention is to provide an improved control circuit for controlling a direct coupling clutch, which control circuit comprises a switching valve for controlling the engagement and disengagement of the direct coupling clutch. It is desirable that the switching valve is free from sticking to the valve body and is not affected in operation of the engagement or disengagement of the direct coupling clutch if some pressurized fluid should leak.

Still another object of this invention is to provide an improved control circuit comprising a switching valve adapted to be supplied at one port with a pressurized fluid of a pressurized lower than that of the line pressure of the control circuit, and to the other port the line pressure. It is desirable that the control circuit be adapted to apply the line pressure through the switching valve, and to a passage to the direct coupling clutch engaging fluid chamber when the automatic transmission is shifted to the third speed position or the overdrive position.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
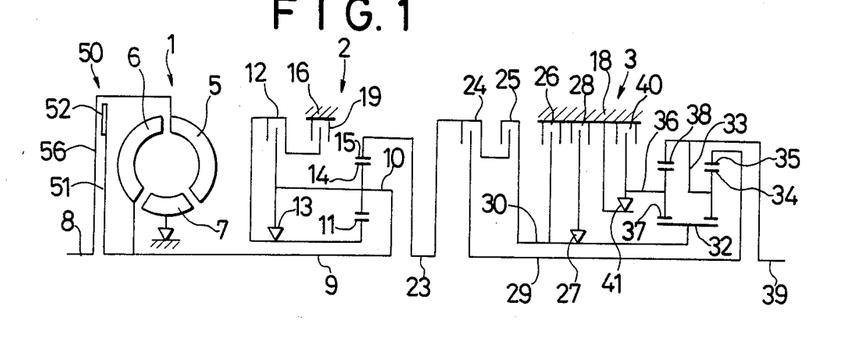
FIG. 1 is a diagrammatic illustration of an automatic transmission.
Figure 2:
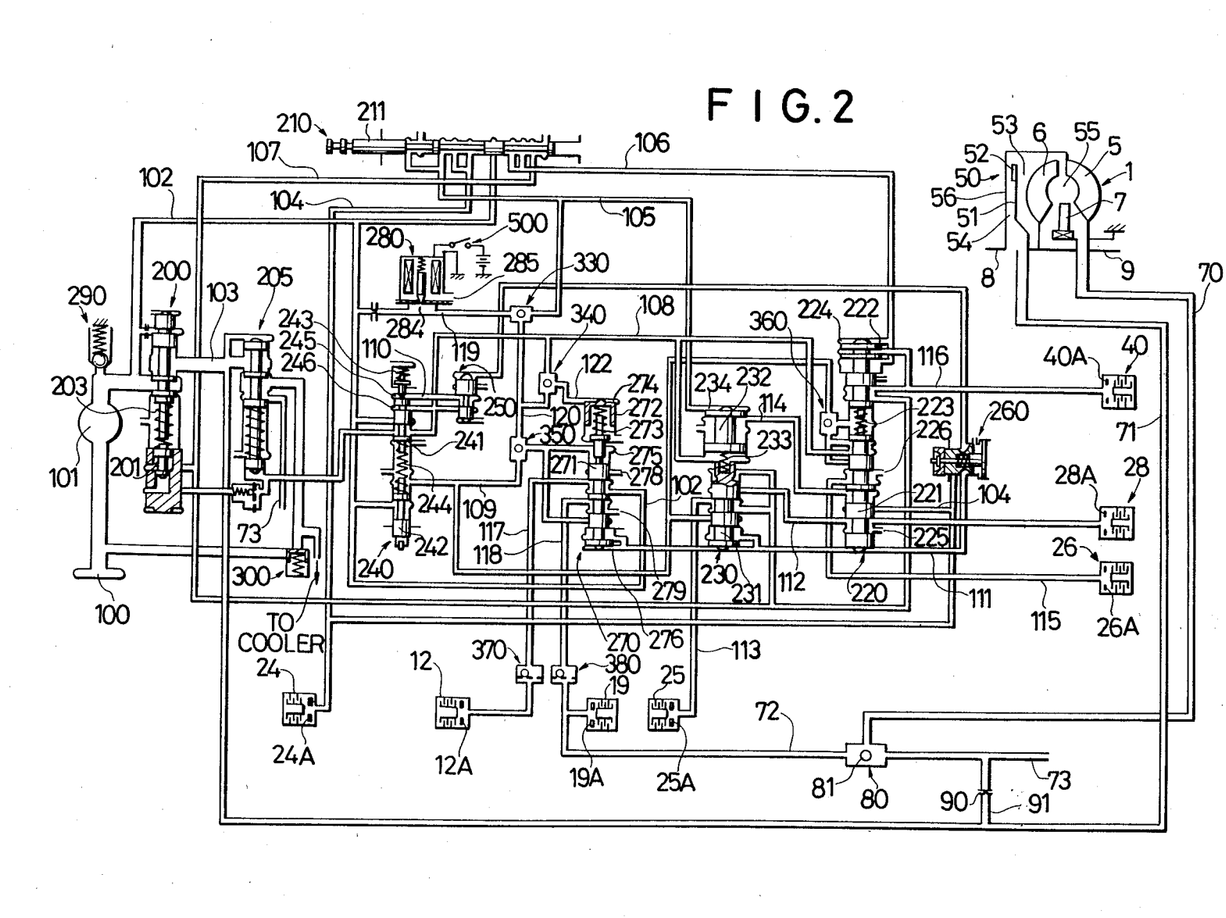
FIG. 2 is a schematic of a hydraulic control system of the automatic transmission of FIG. 1 in accordance with the present invention.

FIG. 1 illustrates a power transmitting mechanism of an automatic transmission suitable for implementing the present invention and FIG. 2 illustrates a hydraulic control circuit of FIG. 1.

This automatic transmission comprises a torque converter 1 equipped with a direct coupling clutch 50, an overdrive mechanism 2, and a gear-type transmission 3 of three forward ranges and one reverse range. The torque converter 1 is of a known type comprising a pump impeller 5, a turbine runner 6 and a stator 7. The pump impeller 5 is joined with the crank shaft 8 of an engine. The turbine runner 6 is joined with a turbine shaft 9. The turbine shaft 9 serves as the output shaft of the torque converter and at the same time as the input shaft of the overdrive mechanism 2. The turbine shaft 9 overdrive (O/D) range and one reverse range. The conditions of the clutches and the brakes with respect to the speed range selections are shown in Table 1.

TABLE 1

| Clutch brake and one way clutch | CL 12 | CL 24 | CL 25 | BR 19 | BR 26 | BR 28 | BR 40 | OC 13 | OC 27 | OC 41 |
|---|---|---|---|---|---|---|---|---|---|---|
| Gear shift positions | | | | | | | | | | |
| Parking | O | X | X | X | X | X | O | | | |
| Reverse | O | X | O | X | X | X | O | LC | OR | LC |
| Neutral | O | X | X | X | X | X | X | | | |
| D 1st | O | O | X | X | X | X | X | LC | LC | LC |
| 2nd | O | O | X | X | X | O | X | LC | LC | OR |
| 3rd | O | O | O | X | X | O | X | LC | OR | OR |
| O.D. (4th) | X | O | O | O | X | O | X | OR | OR | OR |
| 2 1st | O | O | X | X | X | X | X | LC | LC | LC |
| 2nd | O | O | X | X | O | O | X | LC | LC | OR |
| L | O | O | X | X | X | X | O | LC | LC | LC | is connected to a carrier 10 of a planetary gear of the overdrive mechanism 2. A direct coupling clutch 50 is interposed between the crank shaft 8 and the turbine shaft 9. The direct coupling clutch 50 comprises a clutch piston 51 slidably mounted on the turbine runner 6 or the turbine shaft 9 for motion in the axial direction, and a friction plate 52 affixed to the surface of either the clutch piston 51 or the housing 56 of the torque converter 1. The crank shaft 8 of the engine and the turbine shaft 9 are frictionally engaged when the clutch piston 51 is pressed against the housing 56.

A planetary pinion 14, rotatably mounted on the carrier 10, is engaged with a sun gear 11 and a ring gear 15. A multiple disk clutch 12 and a one-way clutch 13 are interposed between the sun gear 11 and the carrier 10.

A multiple disk brake 19 is interposed between the sun gear 11 and a fixed member, for example, housing or an overdrive case 16 containing the overdrive mechanism. The ring gear 15 of the overdrive mechanism 2 is connected to the input shaft 23 of a gear-type transmission 3. A multiple disk clutch 24 is interposed between the input shaft 23 and an intermediate shaft 29. A multiple disk clutch 25 is interposed between the input shaft 23 and a sun gear shaft 30. Between the sun gear shaft 30 and the transmission case 18, are interposed a multiple disk brake 26 and, through a one-way clutch 27, a mulitple disk brake 28. A sun gear 32 fixed to the sun gear shaft 30 engages two trains of planetary gear mechanisms in cooperation with a carrier 33, a planetary pinion 34 carried on the carrier 33, a ring gear 35 engaging with a planetary pinion 34, another carrier 36, a planetary pinion 37 carried on the carrier 36, and a ring gear 38 engaging with the planetary pinion 37. The ring gear 35 of one train of the planetary gear mechanisms is connected to the intermediate shaft 29. The carrier 33 of the planetary gear train is connected to the ring gear 38 of the other train of planetary gear mechanism and the carrier 33 and the ring gear 38 are connected to an output shaft 39. A multiple disk brake 40 and a one way clutch 41 are interposed between the carrier 36 of the other train planetary gear mechanisms and the transmission case 18.

The hydraulic automatic transmission, equipped with an overdrive device as hereinafter described in detail, is controlled by a hydraulic control circuit for engaging or releasing the clutches and the brakes. These actions occur in correspondence with engine output and vehicle speed through manual shifting of the transmission between the four forward speed ranges including an In Table 1, symbol "O" represents clutches and brakes in an engaged condition, while symbol "X" represents clutches and brakes in a released condition. Other symbols represent operating conditions as follows: D—forward four range automatic transmission; 2—automatic transmission between the first forward range and second forward range; L—fixed first forward range; OD—overdrive range; CL—clutch; BR—brake; OC—one-way clutch; LC—locked condition; and OR—overrunning condition.

The hydraulic control system, as illustrated in FIG. 2, comprises an oil reservoir 100, an oil pump 101, a line pressure regulating valve 200, a converter pressure regulating valve 205, a manual shift valve 210, a 1-2 shift valve 220, a 2-3 shift valve 230, a throttle valve 240, a cut-back valve 250, a governor valve 260, an overdrive shift valve 270, a solenoid valve 280, a relief valve 290, a by-pass valve 300, check valves 330, 340, 350, 360, 370 and 380, clutches 12, 24 and 25, brakes 19, 26, 28 and 40, hydraulic cylinders 12A, 24A, 25A, 19A, 26A, 28A and 40A serving as pressure chamber hydraulic servomechanisms of the said clutches and brakes, and passages connecting between the hydraulic elements as the valves and hydraulic cylinders.

Operation of the hydraulic control system is described hereinafter.

The pump 101, generates a working pressure for the hydraulic control system and supplies working oil and lubricating oil to the torque converter 1 and to the lubricating parts respectively. The pump 101 is directly driven by an engine (not shown) to pump the oil from the oil reservoir 100 into an oil passage 102. The pressure of the passage 102 is the source of all working pressures, therefore, this pressure is, hereinafter referred to as line pressure. The line pressure regulating valve 200 maintains the line pressure to the passage 102 by balancing between the hydraulic pressure generated by the oil pump 101 and the force of a spring 203. The converter pressure regulating valve 205 regulates the oil pressure applied to an oil passage 103, through the line pressure regulating valve 200, to a pressure lower than the line pressure. The pressurized oil introduced into the passage 103 is supplied to the torque converter 1 and lubricating parts. The relief valve 290 relieves excessively high line pressure levels.

The governor valve 260 is connected to the output shaft 39 shown in FIG. 1. The governor valve 260 generates an oil pressure determined as a function of the rotational velocity of the output shaft 39, on the basis of a balance between centrifugal force, spring force and the oil pressure, i.e., an oil pressure (governor pressure) which increases commensurate with the increase of the rotational velocity of the output shaft 39. Governor pressure is applied to an oil passage 111.

The throttle valve 240, comprising a spool 241, a down-shift plug 242, springs 243, 244 and oil chambers 245, 246, supplies a throttle pressure to an oil passage 108. The throttle pressure varies in proportion to the throttle opening on the basis of a balance between the spring force of the spring 244, biased by movement of the down-shift plug 242 interlocked with the movement of an accelerator pedal (not shown) and the oil pressure working in the oil chambers 245, 246. The throttle pressure in the passage 108 is applied to the 1-2 shift valve 220, the 2-3 shift valve 230 and the overdrive shift valve 270 and controls the timing of shifting corresponding to the engine load. When a kick-down operation is required and the accelerator peda is sharply kicked-down (pressed on the floor), the down-shift plug 242 shifts upward so that the passage 102 communicates with an oil passage 109. Consequently, the line pressure is applied to the 1-2 shift valve 220 and to the 2-3 shift valve 230 through the passage 109 and to the overdrive shift valve 270 through the check valve 350. Kickdown operates to cause a shifting-down operation of the transmission from the fourth speed range to the third speed range, from the third speed range to the second speed range or from the second speed range to the first speed range depending on a relationship to the governor pressure working on the bottom ends of the spools 221, 231, 271 respectively.

The cut-back valve 250 generates a cut-back pressure applied to an oil passage 110 on the basis of a balance with the pressure oil working therein. The cut-back pressure in the passage 110 works on the throttle valve 240 and reduces the throttle pressure to eliminate unnecessary power consumption by the oil pump. The check valves 370, 380 each comprise a check ball, an orifice and ports. The manual shift valve 210 has a spool 211 which is operated by a manual shift lever arranged to be operated by an operator/driver and is adapted to function to introduce the line pressure in the passage 102 to an oil passage or passages 104, 105, 106, 107 corresponding to the position of the manual shift lever as shown in Table 2.

TABLE 2

| Selected position | passage 104 | passage 105 | passage 106 | passage 107 |
| --- | --- | --- | --- | --- |
| R | — | — | O | O |
| N | — | — | — | — |
| D | O | — | — | — |
| 2 | O | O | — | — |
| L | O | O | O | — |

In Table 2, symbol "O" represents communication of the corresponding passages with the line pressure at the respective positions, while symbol "-" represents interruption of the corresponding passage from the line pressure at the respective positions. Operation of the transmission with respect to the selected position of the manual shift lever is: R—rearward, N—neutral, D—four forward speed automatic transmission, 2—forward first speed range and second speed range automatic transmission, and L—forward first speed range fixed transmission.

With the manual shift lever positioned at D-range, the line pressure is applied to the hydraulic cylinder 24A through the passage 104 so that the clutch 24 is continuously kept engaged. In the forward first speed range, second speed range and third speed range, the clutch 12 is engaged in the manner as hereinafter described. The passage 104 introduces the line pressure to the 1-2 shift valve 220 and the governor valve 260. The 1-2 shift valve 220 comprises spools 221, 222 and a spring 223. In the first speed range, the spool 221 is positioned at a lower position thus interrupting the pressurized oil supplied through the passage 104. In the second, third and fourth speed ranges, the spool 221 is shifted upward by the action of the governor pressure applied through the passage 111 allowing the oil to be introduced from the passage 104 into an oil passage 112. The passage 112 is connected to the 2-3 shift valve 230 and the hydraulic cylinder 28A of the brake 28 and supplies the pressurized oil to the hydraulic cylinder 28A to engage the brake 28. When the brake 28 is engaged, the power transmitting mechanism is arranged in the second speed range as indicated in Table 1.

The 2-3 shift valve 230 comprises spools 231 and 232 and a spring 233. In the first speed range and the second speed range, the spool 231 is positioned at a lower position, and in the third speed range and the fourth speed range, the spool 231 is shifted upward by the action of a higher governor pressure applied through the oil passage 111. Upward movement of the spool 231 allows the pressurized oil to flow from the passage 112 into an oil passage 113 so that the pressurized oil is supplied to the hydraulic cylinder 25A of the clutch 25 to engage the clutch 25. When the clutch 25 has been engaged, the power transmitting mechanism is arranged in the third speed range as indicated in Table 1.

The overdrive shift valve 270 comprises a spool 271, a sleeve 272, a spring 273 and oil chambers 274, 275 and 276. The overdrive shift valve switches between either a connection of the passage 102 with an oil passage 117 or with an oil passage 118 in accordance with the oil pressure applied to the oil chambers 274, 275, 276.

The solenoid valve 280 is controlled by an overdrive change-over switch 500 operated by the vehicle driver. When the overdrive change-over switch 500 is in an OFF-position, the orifice 284 is closed. The oil pressure in the passage 102 is applied to the oil chamber 274 of the overdrive shift valve 270 through an oil passage 119, the check valve 330, an oil passage 120, the check valve 340 and an oil passage 122, so that the spool 271 and the sleeve 272 are retained at the respective lower positions. When the overdrive change-over switch 500 is in an ON-position, the solenoid valve 280 is actuated whereby the orifice 284 is opened. Consequently, pressurized oil contained in the oil chamber 274 is drained through the passage 122, the check valve 340, the passage 120, the check valve 330, the passage 119 and the orifice 284 and a drain port 285.

Throttle pressure is applied to the oil chamber 274 from the passage 108 through the check valve 340 and the passage 122. The governor pressure is applied to the oil chamber 276 from the passage 111. The spool 271 is controlled on the basis of the relative magnitude between the throttle pressure and the governor pressure. With the overdrive change-over switch 500 in the OFF-position, the line pressure of the passage 102 is applied to the oil chamber 274 of the overdrive shift valve 270. Therefore, the spool 271 and the sleeve 272 are retained at the respective lower positions and the pressurized oil is supplied from the passage 102 to the hydraulic cylinder 12A of the clutch 12 through the passage 117 and the check valve 370, whereby the clutch 12 is engaged.

With the overdrive change-over switch 500 in the ON-position, the throttle pressure is applied to the oil chamber 274 of the overdrive shift valve 270 through the passage 108. The spool 271 of the overdrive shift valve 270 is controlled by the oil pressures working on the oil chambers 274 and 276, so as to be positioned at the lower position while the transmission is in the first speed range, the second speed range and the third speed range wherein the governor pressure is low. Thus, the line pressure of the passage 102 is applied to the hydraulic cylinder 12A of the clutch 12 through the passage 117 and the check valve 370 to engage the clutch 12.

When the spool 271 shifts upward with an increase of governor pressure, the passage 117 is allowed to communicate with a drain port 278 so that the clutch 12 is released. On the other hand, pressurized oil is introduced from the passage 102, through the passage 118 and the check valve 380; into the hydraulic cylinder 19A of the brake 19, thus causing the brake 19 to be engaged and shifting the transmission to the condition of the fourth speed range (the overdrive range).

With the manual shift lever in the 2-range, the line pressure is applied to the passages 104 and 105. Pressurized oil is introduced, through the passage 105 into the oil chamber 234 of the 2-3 shift valve 230 and retains the spools 231 and 232 at the respective lower positions. Pressurized oil is also introduced, through the check valve 330, the passage 120, the check valve 340 and the passage 122, into the oil chamber 274 of the overdrive shift valve 270 to retain the spool 271 and the sleeve 272 at the lower positions respectively. The pressurized oil in the passage 104 is introduced into the hydraulic cylinder 24A of the clutch 24 and also into the 1-2 shift valve 220. When the spool 221 of the 1-2 shift valve 220 is shifted upward by an increase of governor pressure, the pressurized oil in the passage 104 is introduced, through the passage 112, into the hydraulic cylinder 28A of the brake 28 so that the brake 28 is engaged. The pressurized oil in the passage 105 is introduced, through the 2-3 shift valve 230 and oil passages 114 and 115, to the hydraulic cylinder 26A of the brake 26 so that the brake 26 is engaged. When the clutches 12 and 24, and brakes 26 and 28 are engaged, the power transmitting mechanism is arranged in the condition of the second speed range as shown in Table 1.

When the spool 221 of the 1-2 shift valve 220 is depressed to the lower position with a decrease of the governor pressure, the passage 112 is allowed to communicate with the drain port 225. Thus, the pressurized oil in the hydraulic cylinder 28A is drained from the drain port 225 through the passage 112 to release the brake 28. On the other hand, the passage 115 is allowed to communicate with the drain port 226 so that the pressurized oil in the hydraulic cylinder 26A is drained from the drain port 226 to release the brake 26, thus shifting the power transmitting mechanism to the condition of the first speed range.

With the manual shift lever in the L-range position, the line pressure is applied to passages 104, 105, 106. Pressurized oil introduced through the passage 104 operates to make the clutch 24 engage in a manner similar to that with the range selection lever positioned at the D-range position for the automatic transmission in the respective speed ranges. The pressurized oil introduced into the passage 105 is supplied to the oil chamber 234 to retain the spools 231 and 232 of the 2-3 shift valve 230 at the respective lower positions, and to the oil chamber 274 of the overdrive shift valve 270 to retain the spool 271 and the sleeve 272 of the overdrive shift valve 270 at the respective lower positions. The pressurized oil introduced into the passage 106 is supplied to the oil chamber 224 of the 1-2 shift valve 220 to retain the spools 221 and 222 at the respective lower positions, and also is supplied, through the passage 116, to the hydraulic cylinder 40A of the brake 40 to engage the brake 40. When the clutches 12, 24, and the brake 40 are engaged in the manner as hereinbefore described, the power transmitting mechanism is arranged in the condition of the first speed range as indicated in Table 1.

With the manual shift lever in the R-range position, the line pressure is applied to the passages 106, 107. The line pressure applied to the passage 107 is applied to the oil chamber 201 of the line pressure regulating valve 200 to raise the line pressure and at the same time, line pressure is applied to the oil passage 113 through the 2-3 shift valve 230 to engage the clutch 25. Line pressure applied to the passage 107 is further applied to the passage 116 through the 1-2 shift valve 220 to engage the brake 40. The spool 271 of the overdrive shift valve 270 is retained at a lower position by the spring 273 allowing the passage 102 to communicate with the passage 117, thus engaging clutch 12. When the clutches 12, 25 and the brake 40 are thus engaged, the power transmitting mechanism is arranged in the reverse range position as indicated in Table 1.

Explanation of a direct coupling clutch control system constructed in accordance with one embodiment of the present invention is provided hereinafter referring to FIGS. 2 to 4.

The direct coupling clutch 50 comprises, as hereinbefore described, a clutch piston 51 mounted slidably in the axial direction on the turbine runner 6 (FIG. 3), and a friction plate 52 affixed to the housing 56 (FIG. 3) of the torque converter 1. The clutch piston 51 is disposed with a small gap between the circumference of the clutch piston 51 and the housing 56 for partitioning the interior of the housing 56 of the torque converter 1 into the operating chamber 55 and an oil chamber 54 which serves for releasing the direct coupling clutch 50. The oil chamber 54 communicates with a first oil passage 71. Pressurized oil at a first pressure supplied to the oil chamber 54 through the passage 71 releases the engagement between the clutch piston 51 and the housing 56, and also flows into the operating chamber 55 of the torque converter 1.

An oil chamber 53 interposed between the turbine runner 6 of the torque converter 1 and the clutch piston 51 communicates with a second oil passage 70. When pressurized oil at a second pressure, which is higher than the first pressure, is supplied through the passage 70, the pressurized oil at the second pressure is supplied to the oil chamber 53 through the passage 70. The oil at the second pressure presses the clutch piston 51 against the housing 56 by overcoming the first and lower pressure applied to the oil chamber 54, thus causing the direct coupling clutch 50 to engage.

The first oil passage 71 is continuously connected with the passage 103 having a pressure which is regulated by the converter pressure regulating valve 205 to a pressure level lower than line pressure. In this embodiment the converter pressure regulated by the converter pressure regulating valve 205, a pressure lower than the line pressure, is used as the first pressure and is applied to the oil chamber 54. Pressure in the chamber 54 functions to release the direct coupling clutch 50. The passage 70 is connected with passage 103 through an oil passage 91 and a check valve 80. The passage 70 also connects, through the check valve 80, with a third oil passage 72 to which the pressurized oil at the second pressure, higher than the first pressure, (for example, line pressure) is supplied when the automatic transmission is shifted to a high speed range, such as the third speed range or the overdrive range.

When the second pressure is not applied to the third oil passage 72, the first pressure, i.e., the converter pressure, is applied to the second oil passage 70 through the passage 103. When the second pressure, i.e., the line pressure, is applied to the third oil passage 72, the pressurized oil at the second pressure is supplied to the second oil passage 70 through the passage 72.

In this embodiment, the third oil passage 72 is connected to the passage 118 which communicates FIG. 2 with the oil chamber 19A of a hydraulic servomechanism to which pressurized oil is supplied when the automatic transmission is shifted to the fourth speed range (the overdrive range).

Figure 3:
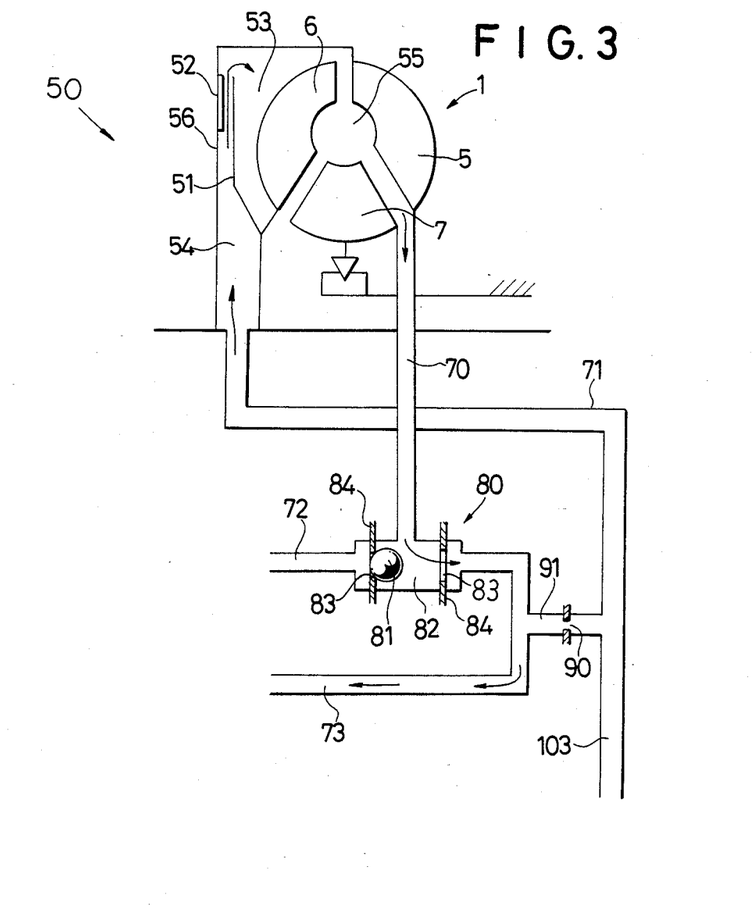
FIG. 3 is a circuit diagram for pressurized fluids in accordance with the present invention showing a direct coupling clutch in a releasing state.
Figure 4:
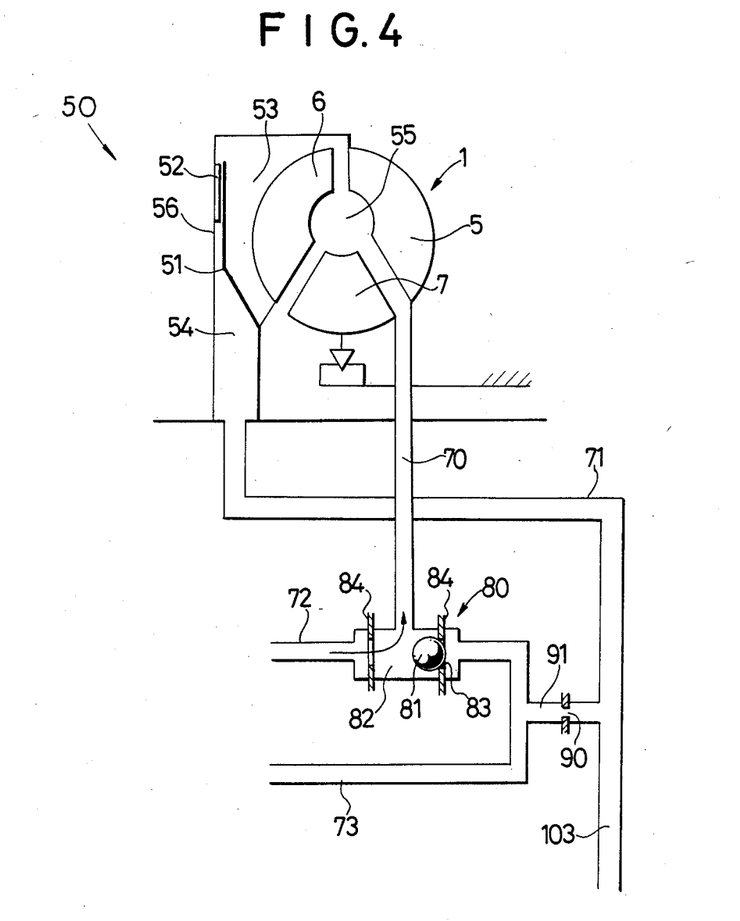
FIG. 4 is a circuit diagram similar to FIG. 3 for pressurized fluids showing the direct coupling clutch in an engaged state.

The check valve 80, as shown in FIGS. 3 and 4, comprises a cylindrical oil chamber 82 connected at one axial end to the passage 72 and at the other axial end to the passage 73. The valve 80 also comprises two plates 84, each having a round hole 83 therethrough, attached within the oil chamber 82 with a suitable distance between them, and a check ball 81 movably provided between the two plates 84. The passage 70 is connected to the oil chamber 82 of the check valve 80 with a port provided between the two plates 84. An oil passage 73 communicates, through the converter pressure regulating valve 205 with an oil cooler (not shown) and, with the oil reservoir 100, and serves as a drain passage. The drain passage 73 connects with the first oil passage 71 by means of an oil passage 91 provided with an orifice 90.

Operation of the direct coupling clutch control system of the present invention is described hereinafter. First described is a releasing condition of the direct coupling clutch.

While the automatic transmission is shifted to the first speed range, the second speed range or the third speed range, no oil pressure is applied to the oil chamber 19A of the hydraulic servomechanism. Also, there is no oil pressure in the third oil passage 72. Consequently, the check ball 81 is, as shown in FIG. 3, pushed against the hole 83 of the left plate 84 by the pressurized oil supplied to the check valve 80 from the second oil passage 70. Pressurized oil, the pressure of which is regulated by the converter pressure regulating valve 205, is introduced through the passages 103, 71 into the direct coupling clutch releasing oil chamber 54 to disengage the direct coupling clutch 51, 56. The oil flows through the operating chamber 55 of the torque converter, and then is drained through the passage 70, the check valve 80 and the drain passage 73.

While the direct coupling clutch is thus released, the passage 72 is connected with a drain port 279 of the overdrive shift valve 270 through the passage 118, so that the pressurized oil, introduced from the passage 103, through the passage 71 into the operating chamber 55 of the torque converter, flows out by way of the passage 70 and the drain passage 73, or by way of the passage 72, the passage 118 and the drain port 279 if valve 80 leaks. Thus, the clutch 50 is in the released condition and the torque converter 1 functions even when the check valve 80 does not function due to wear of the check ball 81 and/or the hole 83.

Engagement of the direct coupling clutch is now described. When the automatic transmission is shifted to the fourth speed range, line pressure is applied to the third oil passage 72. Then the check ball 81 of the check valve 80 is pushed (FIG. 4) against the right plate 84 and the passage 72 is caused to communicate with the second oil passage 70. The line pressure applied to the direct clutch engaging chamber 53 through the oil passage 72, the check valve 80, the oil passage 70 and the operating chamber 55, is higher than the oil pressure applied to the direct clutch releasing chamber 54 through the oil passages 103, 71. Therefore, the clutch piston 51 of the direct coupling clutch 50 is shifted to tle left (FIGS. 1-5), thus engaging the direct coupling clutch as shown in FIG. 4.

If the pressurized oil should flow from the passage 72 into the passage 73 causing a reduced pressure in the passage 70 due to a malfunction in the check valve 80 during the direct coupling condition, only the clutching force of the direct coupling clutch is reduced. In a more extreme situation of reduced pressure, the direct coupling clutch is caused to be released and the power transmitting mechanism is shifted to a condition of torque converter transmission. Therefore, the vehicle runs without trouble, not directly coupled.

As the passages 71, 73 are connected by the passage 91 having an orifice 90, in reducing pressure in the passage 72 under the condition when the direct coupling clutch is engaged, pressurized oil supplied to the passage 73 from the passage 71 through the orifice 90, certainly shifts the check ball 81 to the left so that the passages 70 and 73 are clearly connected and the uncoupled condition of FIG. 3 is reproduced. Because part of the pressurized oil flowing through the oil passage 71 is alowed to flow, through the orifice 90 and the passage 73, into the oil cooler while the direct coupling clutch is engaged, the working oil is sufficiently cooled.

Figure 5:
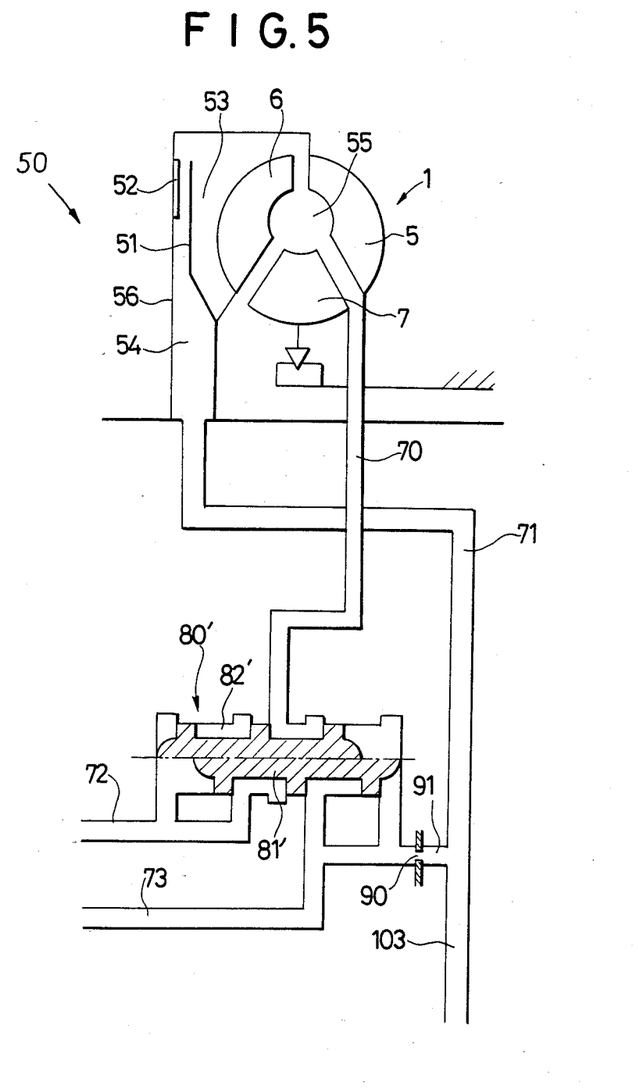
FIG. 5 is a circuit diagram for pressurized fluids of a hydraulic control system in accordance with an alternative embodiment of the present invention.

Referring now to FIG. 5 illustrating another alternative embodiment according to the present invention, a spool 81' is mounted in the cylindrical oil chamber 82' of a check valve 80'. The spool 81' is slidable in the axial direction. The spool 81' is shown in a split section to illustrate both left and right positions. The pressures of the passages 72, 73 are applied to the left end and the right end, respectively, of the spool 81'. When no pressure is applied to the passage 72, the spool 81' is positioned at the left position so that the passage 70 is out off from the passage 72 and connected to the passage 73. When the pressurized oil is introduced into the passage 72, the spool 81' is shifted to the right position. Then the passage 70 is cut off from the drain passage 73 and connected to the passage 72.

It should be understood from what has been described above with respect to preferred embodiments in accordance with the present invention, that the direct coupling clutch control system of the present invention has advantages that:

(1) The converter pressure is continuously applied to the direct coupling clutch releasing oil chamber. The line pressure is applied to the direct coupling clutch engaging oil chamber to make the direct coupling clutch engage, only when the automatic transmission is shifted to the fourth (O.D.) speed range. In these embodiments, O.D. is the range illustrated for engaging the direct coupling clutch. No line pressure is applied to the direct coupling clutch engaging oil chamber when the automatic transmission is shifted to the third speed range in which the direct coupling clutch is released, and the power transmitting mechanism is shifted to a condition of torque converter transmission. Therefore, running of the vehicle is not affected by any trouble, if the check valve for controlling the operation of the direct coupling clutch should malfunction due to wear or sticking.

(2) While the direct coupling clutch is engaged, a part of the pressurized oil flowing through the direct coupling clutch releasing oil passage is introduced to an oil cooling device by way of an orifice and a drain passage, because the direct coupling clutch releasing oil passage and the drain passage are connected by the oil passage including an orifice. Therefore, the hydraulic oil is given sufficient cooling.

In accordance with the present invention, the direct coupling clutch is controlled by a simple system. Furthermore, this invention provides a highly reliable direct coupling clutch control system which is entirely free from a danger of stalling the vehicle due to sticking of the valves.

In the above text, the description of the clutch 50 is as shown in FIGS. 3–5 with the clutch piston 51 mounted on the turbine runner 6 and the friction plate 52 affixed to the housing 56. It should be understood that in an alternative embodiment, the piston 51 mounts on the turbine shaft 9 and the plate 52 attaches to the piston 51 (FIGS. 1,2).

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A direct coupling clutch control system for an automatic transmission comprising a torque converter having a pump impeller, a turbine runner and a stator; a direct coupling clutch constructed between a clutch piston mounted slidably in the axial direction on one of said turbine runner or a shaft to which said turbine runner is affixed and a housing of said torque converter; a first fluid passage communicating with a pressure chamber formed between said housing and said clutch piston; a second fluid passage communicating with a pressure chamber formed between said pump impeller affixed to said housing and said clutch piston; means to continuously introduce a first pressurized fluid of a pressure regulated by a hydraulic control circuit of said automatic transmission to said first fluid passage;

said second fluid passage being connected, through a switching valve, to a third fluid passage to which is introduced a second pressurized fluid at a pressure regulated by said hydraulic control circuit of said automatic transmission when said automatic transmission is shifted to a high speed range, and said secnd pressurized fluid is introduced into said second fluid passage only when said second pressurized fluid is introduced into said third fluid passage, said switching valve being adapted to interrupt the connection of said third fluid passage with said second fluid passage while said second pressurized fluid is not supplied to said third fluid passage and also to interrupt the connection of said second fluid passage with a return passage adapted for returning the working fluid to a fluid reservoir while said second pressurized fluid is supplied to said third fluid passage;

wherein said switching valve comprises a cylindrical oil chamber provided on one end thereof with a port for receiving said first pressurized fluid and on the other end thereof with a port for receiving said second pressurized fluid and a valve element adapted to move between first and second positions for interrupting flow through said ports at said one and the other end respectively, said first pressurized fluid or said second pressurized fluid flowing in said second fluid passage dependent on the pressure differential between the pressures applied to said respective ports.

2. A control system as set forth in claim 1 wherein said first fluid passage is connected to a drain passage by a fluid passage including a resistance so as to deliver the pressurized fluid flowing through said first fluid passage into said drain passage when said secnd pressurized fluid is introduced into said second fluid passage.

3. A control system as set forth in claim 1 wherein said second fluid passage is connected, through a switch valve, to a fluid passage through which said second pressurized fluid is supplied to a servomotor of a friction brake which functions to fix a sun gear engaging a planetary gear of an overdrive mechanism of said automatic transmission.

4. A control system as set forth in claim 1 wherein said switch valve comprises a cylindrical oil chamber, two plates each having a hole and arranged in said oil chamber in axially spaced disposition and a ball mounted in said oil chamber between said two plates, and said ball being adapted to be urged to shut either hole formed on said plate by the pressurized fluid introduced into said oil chamber through either port formed on said cylindrical oil chamber.

5. A control system as set forth in claim 1 wherein said switch valve comprises a cylindrical oil clamber and a spool axially slidable in said cylindrical oil chamber, said spool being adapted to be shifted to one side of said cylindrical oil chamber by a pressurized fluid introduced into said cylindrical oil chamber from said first oil passage cutting off said second fluid passage from said third fluid passage and connecting said second fluid passage to said return passage when said second pressurized fluid is not supplied to said check valve and also adapted to be shifted to the other side of said cylindrical oil chamber by said second pressurized fluid cutting off said second fluid passage from said return passage and connecting the same to said third fluid passage.

6. A direct coupling clutch control system for an automatic transmission, said transmission including a torque converter having at least a pump impeller, comprising:
 a direct coupling clutch including a clutch piston and a fixed portion of said torque converter;
 a first pressure chamber formed between said fixed portion and one side of said clutch piston;
 a first fluid passage communicating with said first pressure chamber;

a second pressure chamber formed between said pump impeller affixed to said fixed portion and the other side of said clutch piston;

a second fluid passage communicating with said second pressure chamber;

means for continuously introducing a first pressurized fluid at a first pressure to said first fluid passage; and means for introducing a second pressurized fluid at a second pressure higher than said first pressure to said second fluid passage, said second fluid being introduced while the automatic transmission is shifted to a high speed range, a third fluid passage, and wherein said means to introduce includes a check valve, said secnnd fluid passage being connected through said check valve to said third fluid passage, said second pressurized fluid being introduced to said third passage and into said second fluid passage only when said second pressurized fluid is introduced into said third fluid passage, a return passage, said check valve being adapted to interrupt the communication of said third fluid passage with said second fluid passage when said second pressurized fluid is not supplied to said third fluid passage, said check valve also being adapted to interrupt a communication of said second fluid passage with said return passage while said second pressurized fluid is supplied to said third fluid passage, said return passage being adapted for returning the first fluid to a fluid reservoir, wherein said check valve comprises a cylindrical oil chamber having on one end thereof a port for receiving said first pressurized fluid, and on the other end thereof a port for receiving said second pressurized fluid, and a valve element adapted to direct either said first pressurized fluid or said second pressurized fluid to said second fluid passage in accordance with the differential between pressures applied to said respective ports.

7. A control system as claimed in claim 6, further comprising a drain passage, said first fluid passage being connected to said drain passage by said third fluid passage, said third fluid passage including a resistance, and said means for introducing is adapted to deliver said first pressurized fluid flowng through said first fluid passage into said drain passage when said second pressurized fluid is delivered into said second fluid passage.

8. A control system as claimed in claim 9, and further comprising a servomotor, a friction brake, and an overdrive mechanism including a sun gear and a planetary gear, said second fluid passage being connected to said third fluid passage through said check valve, said third fluid passage supplying pressurized fluid to said servomotor of said friction brake, said friction brake being adapted to fix the sun gear and planetary gear of said overdrive mechanism.

9. A control system as claimed in claim 6, wherein said check valve comprises a cylindrical oil chamber and two plates, each said plate having a hole therethrough, and arranged in said oil chamber in axially spaced apart disposition, and a ball mounted in said oil chamber between said two plates, said ball being adapted to be urged by said pressurized fluids to shut either one or the other hole formed in said plates dependent on whether the pressurized fluid is introduced into said oil chamber through either one or the other port.

10. A control system as claimed in claim 6, wherein said check valve comprises a cylindrical oil chamber and a spool axially slidable in said cylindrical oil chamber, said spool being adapted to shift to one end of said cylindrical chamber by action of a pressurized fluid introduced in said cylindrical oil chamber from said first oil passgge, shifting said spool to said one end cutting off said second fluid passage from said third fluid passage, and connecting said second fluid passage to said return passage when said second pressurized fluid is not supplied to said check valve.

11. A control system as claimed in claim 10, wherein said spool is further adapted to shift to the other end of said cylindrical oil chamber by action of said second pressurized fluid, said spool at said other end cutting off said second fluid passage from said return passage and connecting said second fluid passage to said third fluid passage.

12. A control system as claimed in claim 6, 9 or 11, wherein said torque converter further includes a turbine runner and a stator, and said fixed portion of said torque converter is a housing.

13. A control system as claimed in claim 6, 9, or 11, wherein the pressure levels of said first and said second pressurized fluids are regulated by a hydraulic control circuit of said automatic transmission.

14. A control system as claimed in claim 6, wherein said torque converter further includes a turbine runner on a shaft and a stator, and said clutch piston is slidably mounted in the axial direction on said turbine runner.

15. A control system as claimed in claim 6, wherein said torque converter further includes a turbine runner on a shaft and a stator and said clutch piston is slidably mounted in the axial direction on said shaft.

16. A control system as claimed in claim 6, 9, or 11, wherein said first pressurized fluid at said first pressure is continuously introduced to said first fluid passage.

17. A direct coupling clutch control system for an automatic transmission including a torque converter having a pump impeller, a turbine runner and a stator, said control system comprising:

a direct coupling clutch constructed between a housing of said torque converter and a clutch piston mounted integrally and rotatably with said turbine runner and slidably in its axial direction with respect to said housing, said clutch piston being adapted to frictionally engage with and disengage from said housing;

a first fluid passage communicating with a first pressure chamber formed between said housing and said clutch piston when said clutch piston is frictionally engaged with said housing;

a secnd fluid passage communicating with a second pressure chamber formed between said pump impeller, affixed to said housing, and said clutch piston;

a gap formed between said housing and the circumference of said clutch piston and communicating said first pressure chamber with said second pressure chamber therethrough when said clutch piston is disengaged from said housing;

means to continuously introduce a first pressurized fluid of a pressure regulated by a hydraulic control circuit of said automatic transmission into said first pressure chamber through said first fluid passage;

a third fluid passage to which a second pressurized fluid of a pressure greater than the pressure of said first pressurized fluid regulated by said hydraulic control circuit is introduced when said automatic transmission is shifted to a high speed range;

a switching valve being adapted to selectively connect said second fluid passage with said third fluid passage when said second pressurized fluid is introduced into said third fluid passage and with a drain passage when said second pressurized fluid is not introduced into said third fluid passage, whereby said first pressurized fluid is circulated from said first fluid passage to said drain passage through said first pressure chamber, said gap, said second pressure chamber, said second fluid passage and said switching valve so as to disengage said clutch piston of said direct coupling clutch from said housing when said pressurized fluid is not introduced into said third fluid passage and said second pressurized fluid is supplied to said second pressure chamber from said third fluid passage through said switching valve and said second fluid passage when said second pressurized fluid is introduced into said third fluid passage so as to engage said clutch piston of said direct coupling clutch with said housing by a pressure difference between the pressure prevailing in said first pressure chamber and said second pressure chamber, wherein said switcing valve comprises a cylindrical fluid chamber provided on one axial end thereof with a port for communicating with said third passage and on the other axial end thereof with a port for communicating with said drain passage and a valve element mounted in said cylindrical fluid chamber and adapted to move by the pressure difference acting on the opposite sides thereof between a first position where said first pressurized fluid supplied in said second fluid passage from said second pressure chamber is directed to said drain passage when said second pressurized fluid is not introduced into said third fluid passage and a second position where said second pressurized fluid introduced into said third fluid passage is directed to said second fluid passage.

18. A direct coupling clutch control system for an automatic transmission including a torque converter having a pump impeller, a turbine runner and a stator, said control system comprising:

a direct coupling clutch constructed between a housing of said torque converter and a clutch piston mounted integrally and rotatably with said turbine runner and slidably in its axial direction with respect to said housing, said clutch piston being adapted to frictionally engage with and disengage from said housing;

a first fluid passage communicating with a first pressure chamber formed between said housing and said clutch piston when said clutch piston is frictionally engaged with said housing;

a second fluid passage communicating with a second pressure chamber formed between said pump impeller, affixed to said housing, and said clutch piston;

a gap formed between said housing and the circumference of said clutch piston and communicating said first pressure chamber with said second pressue chamber therethrough when said clutch piston is disengaged from said housing;

means to continuously introduce a first pressurized fluid of a pressure regulated by a hydraulic control circuit of said automatic transmission into said first pressure chamber through said first fluid passage;

a third fluid passage to which a second pressurized fluid of a pressure greater than the pressure of said first pressurized fluid regulated by said hydraulic control circuit is introduced when said automatic transmission is shifted to a high speed range;

a switching valve being adapted to selectively connect said second fluid passage with said third fluid passage when said second pressurized fluid is introduced into said third fluid passage and with a drain passage when said second pressurized fluid is not introduced into said third fluid passage, whereby said first pressurized fluid is circulated from said first fluid passage to said drain passage through said first pressure chamber, said gap, said second pressure chamber, said second fluid passage and said switching valve so as to disengage said clutch piston of said direct coupling clutch from said housing when said pressurized fluid is not introduced into said third fluid passage and said second pressurized fluid is supplied to said second pressure chamber from said third fluid passage through said switching valve and said second fluid passage when said second pressurized fluid is introduced into said third fluid passage so as to engage said clutch piston of said direct coupling clutch with said housing by a pressure difference between the pressure prevailing in said first pressure chamber and said second pressure chamber, wherein said switching valve comprises a cylindrical fluid chamber, two plates each having a hole and arranged in said fluid chamber in an axially spaced position and a ball mounted in said fluid chamber between the two plates, and said ball being adapted to move by a pressure difference acting on the opposite sides thereof and to be urged to either one of the hole of one plate for directing said first pressurized fluid supplied in said second fluid passage from said second pressure chamber to said drain passage when said second pressurized fluid is not introduced into said third fluid passage and to the hole of the other plate for directing said second pressurized fluid introduced into said third fluid passage to said second fluid passage.

19. The direct coupling clutch control system of claim 17, further comprising an overdrive mechanism for said automatic transmission including a sun gear, at least a planetary gear, a ring gear, a friction brake for fixing said sun gear to a housing in which said overdrive mechanism is contained and a servomotor for actuating said friction brake, said third fluid passage being connected to a fluid passage through which said second pressurized fluid is supplied to said servomotor, for establishing an overdrive range of said automatic transmission.

20. A direct coupling clutch control system for an automatic transmission including a torque converter having a pump impeller, a turbine runner and a stator, said control system comprising:

a direct coupling clutch constructed between a housing of said torque converter and a clutch piston mounted integrally and rotatably with said turbine runner and slidably in its axial direction with respect to said housing, said clutch piston being adapted to frictionally engage with and disengage from said housing;

a first fluid passage communicating with a first pressure chamber formed between said housing and said clutch piston when said clutch piston is frictionally engaged with said housing;

a second fluid passage communicating with a second pressure chamber formed between said pump impeller, affixed to said housing, and said clutch piston;

a gap formed between said housing and the circumference of said clutch piston and communicating said first pressure chamber with said second pressure chamber therethrough when said clutch piston is disengaged from said housing;

means to continuously introduce a first pressurized fluid of a pressure regulated by a hydraulic control circuit of said automatic transmission into said first pressure chamber through said first fluid passage;

a third fluid passage to which a second pressurized fluid of a pressure greater than the pressure of said first pressurized fluid regulated by said hydraulic control circuit is introduced when said automatic transmission is shifted to a high speed range;

a switching valve being operated by a pressure difference between said first pressurized fluid and said second pressurized fluid and adapted to selectively connect said second fluid passage with said first fluid passage when said second pressurized fluid is introduced into said third passage and with a drain passage when said second pressurized fluid is not introduced into said third fluid passage; and a fourth fluid passage connecting said first fluid passage and said drain passage and including a resistance therein, whereby said first pressurized fluid is circulated from said first fluid passage to said drain passage through said first pressure chamber, said gap, said second pressure chamber, said second fluid passage and said switching valve so as to disengage said clutch piston of said direct coupling clutch from said housing when said second pressurized fluid is not introduced into said third fluid passage, said second pressurized fluid is supplied to said second pressure chamber from said third fluid passage through said switching valve and said second fluid passage and excess quantity of said first pressurized fluid flowing in said first fluid passage is drained to said drain passage through said fourth fluid passage when said second pressurized fluid is introduced into said third fluid passage so as to engage said clutch piston of said direct coupling clutch with said housing by a pressure difference between the pressure prevailing in said first pressure chamber and said second pressure chamber and the communication of said second fluid passage and said third fluid passage is interrupted by the pressure of the first pressurized fluid supplied to said switching valve from said first fluid passage through said fourth passage under the condition when the direct coupling clutch is disengaged and the pressure of said second presurized fluid is reduced.

21. The direct coupling clutch control system of claim 20, wherein said switching valve comprises a cylindrical fluid chamber provided on one axial end thereof with a port for communicating with said third fluid passage and on the other axial end thereof a port for communicating with said drain passage and a valve element mounted in said cylindrical fluid chamber and adapted to move by the pressure acting on the opposite sides thereof between a first position where said first pressurized fluid supplied in said second fluid passage from said second pressure chamber is directed to said drain passage when said pressurized fluid is not introduced into said third fluid passage and a second position where said second pressurized fluid introduced into said third fluid passage is directed to said second fluid passage.

22. The direct coupling clutch control system of claim 20, wherein said switching valve comprises a cylindrical fluid chamber, two plates each having a hole and arranged in said fluid chamber in axially spaced position and a ball mounted in said fluid chamber between said two plates, said ball being adapted to move by the pressure difference acting on the opposite sides thereof and to be urged to one of the hole of one plate for directing said first pressurized fluid supplied in said second fluid passage from said second pressure chamber to said drain passage when said second pressurized fluid is not introduced into said third fluid passage, and the hole of the other plate for directing said second pressurized fluid introduced into said third fluid passage to said second fluid passage.

23. The direct coupling clutch control system of claim 20, further comprising an overdrive mechanism for said automatic transmission including a sun gear, at least a planetary gear, a ring gear, a friction brake for fixing said sun gear to a housing in which said overdrive mechanism is contained and a servomotor for actuating said friction brake, said third fluid pasage being connected to a fluid passage through which said second pressurized fluid is supplied to said servomotor, for establishing an overdrive range of said automatic transmission.

24. A direct coupling clutch control system for an automatic transmission including a torque converter having a pump impeller, a turbine runner and a stator, said control system comprising;

a direct coupling clutch constructed between a housing of said torque converter and a clutch piston mounted integrally and rotatably with said turbine runner and slidably in its axial direction with respect to said housing, said clutch piston being adapted to frictionally engage with and disengage from said housing;

a first fluid passage communicating with a first pressure chamber formed between said housing and said clutch piston when said clutch piston is frictionally engaged with said housing;

a second fluid passage communicating with a second pressure chamber formed between said pump impeller, affixed to said housing, and said clutch piston;

a gap formed between said housing and the circumference of said clutch piston and communicating said first pressure chamber with said second pressure chamber therethrough when said clutch piston is disengaged from said housing;

means to continuously introduce a first pressurized fluid of a pressure regulated by a hydraulic control circuit of said automatic transmission into said first pressure chamber through said first fluid passage;

a third fluid passage to which a second pressurized fluid of a pressure greater than the pressure of said first pressurized fluid regulated by said hydraulic control circuit is introduced when said automatic transmission is shifted to a high speed range;

a fourth fluid passage connecting said first fluid passage and a drain passage and including a resistance therein; and a switching valve including a cylindrical fluid chamber, a spool mounted axially slidable in said cylindricla fluid chamber, a first port provided on one axial end of said cylindrical fluid chamber for applying the pressure of said first pressurized fluid in said first fluid passage on one axial end of said spool, a second port provided on the other axial end of said cylindrical fluid chamber for applying the pressure of said second pressurized fluid in said third fluid passage on the other axial end of said spool, said spool being adapted to move by a pressure difference acting on the axial ends thereof between a first position where said second fluid passage is communicated with said drain passage through said switching valve and the communication of said second fluid passage with said third passage is interrupted, when said second pressurized fluid is not introduced into said third fluid passage, and a second position where said second fluid passage is communicated with said third fluid passage through said switching valve and the communication of said second passage with said drain passage is interrupted, when said second pressurized fluid is introduced into said third fluid passage, whereby said first pressurized fluid is circulated from said first fluid passage to said drain passage through said first pressure chamber, said gap, said second pressure chamber, said second fluid passage and said switching valve so as to disengage said clutch piston of said direct coupling clutch from said housing when said second pressurized fluid is not introduced into said third fluid passage, said second pressurized fluid is supplied to said second pressure chamber from said third fluid passage through said switching valve and said second fluid passage and excess quantity of said first pressurized fluid flowing in said first fluid passage is drained to said drain passage through said fourth fluid passage when said second pressurized fluid is introduced into said third passage so as to engage said clutch piston of said direct coupling clutch with said housing by the pressure difference between the pressure prevailing in said first pressure chamber and said second pressure chamber and the communication of said second fluid passage with said third fluid passage is interrupted by the pressure of said first pressurized fluid acting on one axial end of said spool under the condition when the direct coupling clutch is disengaged and the pressure of the second pressurized fluid acting on the other axial end of said spool is reduced.

25. The direct coupling clutch control system of claim 24, wherein said switching valve further comprises a third port communicating with said second fluid passage, a fourth port communicating with said drain port and a fifth port communicating with said third fluid passage, said spool includes lands for selectively communicating said third port with one of said fourth and fifth ports with the movement of said spool.

26. The direct coupling clutch control system of claim 25, wherein said first port of said switching valve is communicated with said fourth fluid passage and said second port of said switching valve is communicated with said third fluid passage.

27. The direct coupling clutch control of claim 24, further comprising an overdrive mechanism for said automatic transmission including a sun gear, at least a planetary gear, a ring gear, a friction brake for fixing said sun gear to a housing in which said overdrive mechanism is contained and a servomotor for actuating said friction brake, said third fluid passage being connected to a fluid passage through which said second pressurized fluid is supplied to said servomotor, for establishing an overdrive range of said automatic transmission.

* * * * *